Patented Aug. 27, 1946

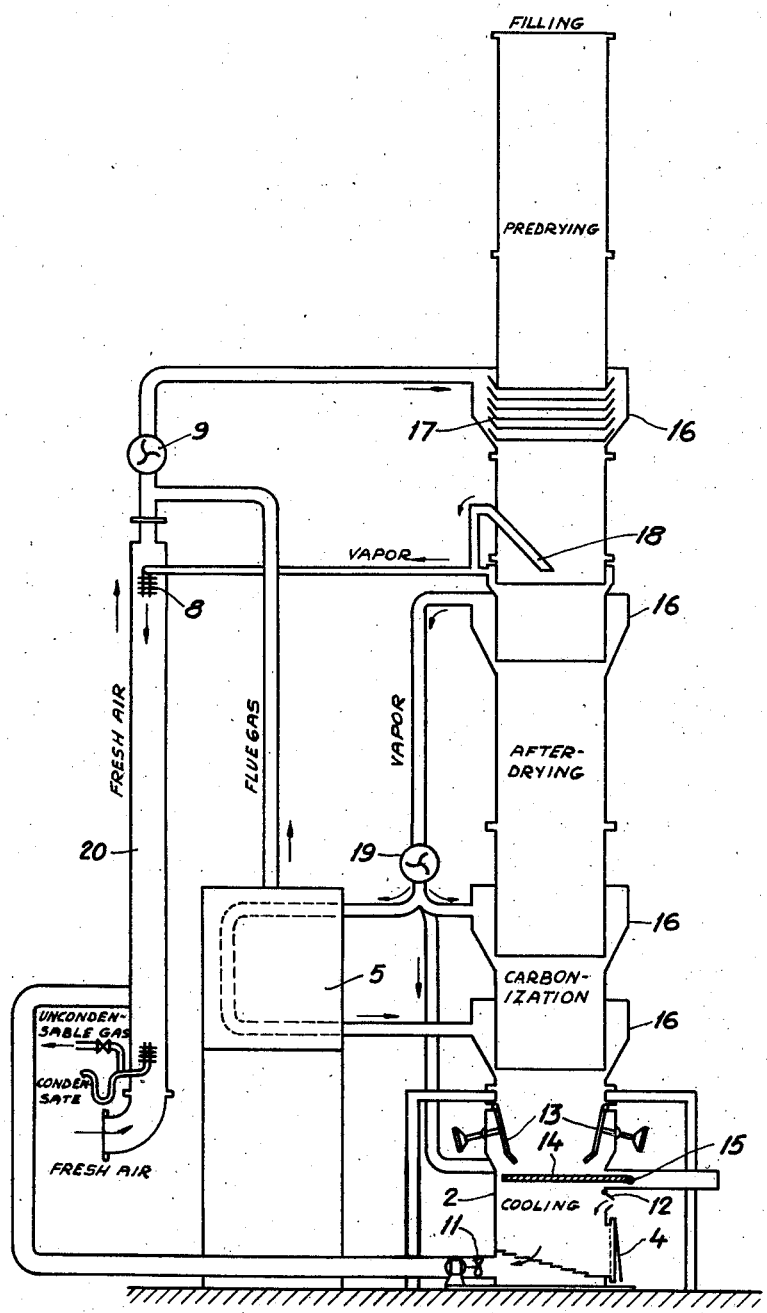

2,406,509

UNITED STATES PATENT OFFICE 2,406,509

METHOD OF AND APPARATUS FOR CARBONIZING PEAT

Claës-Wilhelm Pilo, Stockholm, Sweden

Application February 11, 1944, Serial No. 521,952
In Sweden December 22, 1942

11 Claims. (Cl. 202—16)

The present invention relates to a method for continuous drying of material in solid form and for partly or completely carbonizing peat or other solid carbonaceous material which consists substantially of carbon compounds and water.

The invention is described below, reference being had to the accompanying drawing, which shows a plant according to the invention particularly intended for part carbonization of peat.

In the plant according to the drawing, peat the moisture contents of which are about 50% for example, is charged into the top of a vertical shaft. The peat sinks through the shaft, passing a predrying zone in which the moisture contents are reduced to about 30 to 35%, then an after-drying zone in which the rest of the moisture leaves, and finally a carbonizing zone in which the hemicellulose is disintegrated.

The required heat is supplied by a superheater 5 connected to a furnace which may be heated with peat. This superheater heats a vapor quantity circulating through the carbonizing zone and the after-drying zone, the said vapor being held in circulation by a fan 19. The vapor is selfformed at the start of the plant, the air being expelled. During the drying continued generation of vapor takes place, excess of vapor being led off to a condensing battery 8 in which the vapor through condensation gives off heat to an air quantity flowing to the predrying zone, the said air being blown forth by a fan 9.

According to the embodiment of the invention illustrated on the drawing, some vapor circulation is also provided for through the after-drying zone only. The object of this vapor circulation is to increase the heat transfer to the peat by increased vapor speed and to reduce the temperature in the lower portion of the after-drying zone in such a way that no carbonization takes place in the said after-drying zone because it would then be more difficult to remove the moisture remaining in the center of the peat column.

All the circulating gas quantities may be varied, for instance by controlling the speed of the fans.

To the hot air by which the predrying is effected in the uppermost portion of the shaft, flue gases from the superheater 5 are admitted in the plant according to the drawing, the said flue gases, together with fresh air which has absorbed heat from the condenser 8, being pressed into the shaft by the fan 9.

In order to recover part of the natural heat of the hot peat coal and simultaneously obtain such a reduction of the temperature of the peat coal as to decrease the risk of self-ignition when the peat coal contacts the air, a gas vapor mixture which, without passing the superheater, is led off by means of the fan 19 from the gas vapor mixture withdrawn from the after-drying zone, is admitted into the shaft below the carbonizing zone.

The lower-most shaft portion 2 is formed as cooling chamber and may be separated from the upper zones by means of a shutter 14. Cooling air is sucked by a fan 11 from an inlet opening 12 through the material in the cooling chamber and, then, discharged into the preheater 29 belonging to the condensing apparatus and through the fan 9, from where, possibly after mixing with flue gases from the superheater, it is admitted into the uppermost portion of the shaft; thus part of the natural heat of the peat coal can be recovered, and at the same time a fan can be spared.

The ready carbonized peat is subjected to mechanical compression at a point in the lower portion of the shaft. After having been compressed, the material is allowed to fall down into the lowermost portion of the shaft, which portion is formed as a cooling chamber and otherwise held separated from the rest of the shaft by a movable shut-off member. In the plant according to the drawing there are arranged in the shaft a number of pivoted screens 13, which at the bottom may be provided with oblique surfaces as shown in the drawing, the said screens being adapted to be actuated from the outside by hand wheels and to be locked in different positions. When the screens 13 are swung inwards, the material between the "screens" is compressed. Thereafter the shutter 14 closing the cooling chamber 2 is displaced toward one side of the shaft by the actuation of a toothed wheel 15 engaging a toothed rack on the lower side of the shutter, so that the compressed material falls down into the cooling chamber which is then closed by the shutter 14 being returned to its closing position. The screens 13 are then turned back to their initial positions permitting the material to sink down on to the shutter. After the carbonized peat has been cooled, it is removed through the discharge opening 4. The grate and the dscharge opening are preferably arranged in such a way that the carbonized product can be easily discharged direct into a wagon or to some other conveying device.

Preferably, the gas and vapor are admitted into and led off from the shaft through openings extending around the shaft, the said opening being connected to annular chambers 16 surrounding the shaft casing, the said chamber having tangential inlet and outlet conduits, respectively. As shown, the annular chambers 16 may communicate with the shaft through a plurality of openings 17 directed obliquely downwards; this is of particular advantage in the upper portion of the shaft where a low gas speed is desired. In order to suck the vapor from the interior of the shaft, a suction pipe 18 extends from the center of the shaft, the opening of the said pipe being covered with a net when comminuted material is treated.

The invention has now with reference to the accompanying drawing been described as relating to part-carbonization of peat. However, fundamentally the same method may be used with advantage for complete carbonization of peat as well as for drying of other material, whereby the drying, if desired, may be followed by a heat treatment for other purposes, as for example for complete carbonization.

Having now described my invention, what I claim as new and desire to secure by Letters Patent is:

1. A continuous method of converting peat into a solid fuel, which method comprises feeding the raw peat to be converted from above into a shaft and permitting it to sink continuously, in a coherent column of substantially uniform cross-section, through three successive zones of said shaft while passing through the uppermost predrying zone of the shaft in countercurrent to the descending peat a hot gas current consisting to at least a considerable part of hot air, passing through the next lower after-drying zone of said shaft in countercurrent to the descending peat a hot gas current containing superheated water vapor at a temperature below the carbonizing temperature of the peat, and passing through the third carbonizing zone of said shaft below said after-drying zone a hot gas current containing superheated water vapor at a temperature above the carbonizing temperature of the peat.

2. In a method as claimed in claim 1, the steps of continuously withdrawing a gas stream from the top of said after-drying zone, recirculating part of said stream directly into the bottom of the after-drying zone, superheating another part of said stream, and recirculating the superheated part into the bottom of the carbonizing zone.

3. In a method as claimed in claim 1, the steps of continuously withdrawing a gas stream from the column of peat at the top of the after-drying zone, recirculating part of said gas stream directly into the bottom of the after-drying zone, superheating another part of said gas stream, recirculating the superheated part into the bottom of the carbonizing zone, continuously withdrawing a second gas stream from the column of peat at the top of the after-drying zone, and utilizing said second gas stream to heat the gas current to be passed through the predrying zone.

4. In a method as claimed in claim 1, the steps of continuously withdrawing a gas stream from the column of peat at the top of the after-drying zone, recirculating one part of said gas stream directly into the bottom of the after-drying zone, recirculating a second part of said gas stream directly into said shaft below said carbonizing zone, superheating a third part of said gas stream, recirculating the superheated part of the stream into the bottom of the carbonizing zone, withdrawing a second gas stream from the after-drying zone, and utilizing said second gas stream to heat the gas current to be passed through the predrying zone.

5. In a method as claimed in claim 1, the steps of superheating the gas current to be passed through the carbonizing zone by means of a furnace and introducing the flue gases from said furnace into the gas current to be passed through the predrying zone.

6. In a method as claimed in claim 1, the step of cooling the carbonized peat at the bottom of the shaft by passing a gaseous medium through the column of material at the bottom of the shaft, withdrawing said gaseous medium from the shaft and introducing it into a gas current to be passed through the predrying zone.

7. Apparatus for drying peat, comprising a vertical shaft including a predrying zone at its top, an after-drying zone below said predrying zone, and a carbonizing zone below said after-drying zone, an inlet into said predrying zone nearer to the bottom than to the top of the latter, an air conduit having one end connected to said inlet and its other end open to the atmosphere, a fan inserted into said air conduit to force air through said conduit into and through said predrying zone in countercurrent to the descending material, a vapor discharge conduit near the top of said after-drying zone, a vapor outlet at the top end of the after-drying zone, a recirculating conduit connected to said vapor outlet, a second fan having its suction side connected to said recirculating conduit, a branch conduit leading from the pressure side of said second fan directly into said shaft at the bottom of the after-drying zone, a superheater, and a second branch conduit leading from the pressure side of said second fan through said superheater into said shaft at the bottom of said carbonizing zone.

8. Apparatus as claimed in claim 7, in which said vapor discharge conduit includes a portion arranged in heat-exchange relationship relative to said air conduit.

9. Apparatus as claimed in claim 7, in which said superheater includes a furnace and a conduit connects the flue of said furnace to the suction part of said air conduit.

10. Apparatus as claimed in claim 7, in which said shaft includes a cooling zone near its bottom, an inlet port for a cooling gas into said cooling zone of said shaft, and a conduit having one end connected to the cooling zone of said shaft at a point remote from said inlet and its opposite end opening into said air conduit.

11. Apparatus according to claim 7, including a third branch conduit leading from the pressure side of said second fan into said shaft below said carbonizing zone.

CLAËS-WILHELM PILO.